(12) United States Patent
Huber et al.

(10) Patent No.: US 10,830,681 B2
(45) Date of Patent: Nov. 10, 2020

(54) METHOD AND MEASURING APPARATUS FOR DETERMINING COMPRESSIBILITY OF A FLOWING FLUID

(71) Applicant: Endress+Hauser Flowtec AG, Reinach (CH)

(72) Inventors: Christof Huber, Bern (CH); Michael Lambrigger, Basel (CH)

(73) Assignee: Endress+Hauser Flowtec AG, Reinach (CH)

( * ) Notice: Subject to any disclaimer, the term of this patent is extended or adjusted under 35 U.S.C. 154(b) by 218 days.

(21) Appl. No.: 15/758,556

(22) PCT Filed: Aug. 24, 2016

(86) PCT No.: PCT/EP2016/069996
§ 371 (c)(1),
(2) Date: Mar. 8, 2018

(87) PCT Pub. No.: WO2017/045887
PCT Pub. Date: Mar. 23, 2017

(65) Prior Publication Data
US 2018/0246024 A1    Aug. 30, 2018

(30) Foreign Application Priority Data
Sep. 15, 2015    (DE) .......................... 10 2015 115 499

(51) Int. Cl.
*G01N 9/26* (2006.01)
*G01F 1/44* (2006.01)
(Continued)

(52) U.S. Cl.
CPC ................. *G01N 9/26* (2013.01); *G01F 1/36* (2013.01); *G01F 1/44* (2013.01); *G01F 1/84* (2013.01);
(Continued)

(58) Field of Classification Search
CPC ................. G01N 9/26; G01F 1/44; G01F 1/36
(Continued)

(56) References Cited

U.S. PATENT DOCUMENTS 5,400,657 A * 3/1995 Kolpak ..................... G01F 1/74
 73/19.1
6,474,152 B1 * 11/2002 Mullins ................. G01N 21/359
 166/250.01
(Continued)

FOREIGN PATENT DOCUMENTS

CA    2622202 A1    4/2007
CA    2622602 A1    4/2007
(Continued)

OTHER PUBLICATIONS

Search Report for German Patent Application No. 10 2015 115 499.4, German Patent Office, dated May 30, 2016, 9 pp.
(Continued)

*Primary Examiner* — John Fitzgerald
*Assistant Examiner* — Rodney T Frank
(74) *Attorney, Agent, or Firm* — Kelly J. Smith; Endress+Hauser (USA) Holding Inc.

(57) ABSTRACT

A method for determining compressibility of a flowing fluid includes: using a pump, driving a volume flow of the fluid through a measuring tube of a vibronic densimeter at a first pressure maintained using a throttle; determining a first density measured value of the fluid at the first pressure; determining a first pressure measured value at the first pressure; driving a volume flow of the fluid through the densimeter at a second pressure; determining a second density measured value at the second pressure different from the first pressure; determining a second pressure measured value at the second pressure; determining compressibility of the fluid based on the first density measured value, the (Continued)

second density measured value, the first pressure measured value and the second pressure measured value assuming the composition of the fluid is unchanged between the registering of the first density measured value and the second density measured value.

18 Claims, 3 Drawing Sheets

(51) Int. Cl.
    *G01F 1/36*     (2006.01)
    *G01N 9/00*     (2006.01)
    *G01F 5/00*     (2006.01)
    *G01F 15/00*     (2006.01)
    *G01F 1/84*     (2006.01)
    *G01F 1/88*     (2006.01)

(52) U.S. Cl.
    CPC ............ *G01F 5/005* (2013.01); *G01F 15/005* (2013.01); *G01N 9/002* (2013.01); *G01F 1/88* (2013.01); *G01F 15/001* (2013.01)

(58) Field of Classification Search
    USPC ........................................................ 73/32 A
    See application file for complete search history.

(56) References Cited

U.S. PATENT DOCUMENTS

| | | | |
|---|---|---|---|
| 2005/0138993 A1 | 6/2005 | Mattar et al. | |
| 2007/0180929 A1* | 8/2007 | Rieder | G01F 1/74 73/861.17 |
| 2007/0186686 A1* | 8/2007 | Drahm | G01F 1/8409 73/861.357 |
| 2008/0053220 A1 | 3/2008 | Allen | |
| 2008/0053221 A1 | 3/2008 | Allen | |
| 2011/0161018 A1 | 6/2011 | Kumar et al. | |
| 2012/0085434 A1 | 4/2012 | Powanda | |
| 2013/0199306 A1* | 8/2013 | Kolahi | G01F 1/74 73/861.355 |
| 2013/0204533 A1* | 8/2013 | Goodwin | E21B 49/10 702/9 |
| 2015/0047835 A1* | 2/2015 | Ali | E21B 47/102 166/250.01 |
| 2015/0052997 A1* | 2/2015 | Schlachter | G01F 23/14 73/299 |
| 2016/0252454 A1* | 9/2016 | Zuo | G01N 11/00 250/254 |

FOREIGN PATENT DOCUMENTS

| | | |
|---|---|---|
| CN | 102156086 A | 8/2011 |
| CN | 102686986 A | 9/2012 |
| DE | 102013113689 A1 | 6/2015 |
| EP | 2012117 A1 | 1/2009 |
| EP | 2365298 A2 | 9/2011 |
| EP | 1502085 B1 | 9/2015 |
| WO | 2014158376 A1 | 10/2014 |

OTHER PUBLICATIONS

Search Report for International Patent Application No. PCT/EP2016/069996, WIPO, dated Dec. 2, 2016, 13 pp.

* cited by examiner

METHOD AND MEASURING APPARATUS FOR DETERMINING COMPRESSIBILITY OF A FLOWING FLUID

CROSS-REFERENCE TO RELATED APPLICATIONS

The present application is related to and claims the priority benefit of German Patent Application No. 10 2015 115 499.4, filed on Sep. 15, 2015 and International Patent Application No. PCT/EP2016/069996, filed on Aug. 24, 2016 the entire contents of which are incorporated herein by reference.

TECHNICAL FIELD

The present invention relates to a method for determining compressibility of a flowing fluid.

BACKGROUND

The density of a fluid under reference conditions, especially at a reference pressure of 1013 MPa, is of interest for evaluation of fluids. It is, however, in many cases, not directly available. A solution is to calculate the density at reference pressure from a density measured value, which was registered at a higher pressure. In order to be able to perform this calculation reliably, an as exact as possible knowledge of the compressibility is required.

SUMMARY

It is, therefore, an object of the present invention to provide a method and a measuring apparatus, which enable an as simple as possible and reliable determining of the compressibility of a fluid, especially for determining the density of a medium at a reference pressure.

The object of the invention is achieved by the method of the independent claim 1 and the apparatus of the independent claim 9.

The method of the invention for determining compressibility of a flowing fluid comprises steps as follows:

driving a volume flow of the fluid by means of a pump through at least one measuring tube of a vibronic densimeter at a first pressure, which is maintained by means of a throttle;

determining a first density measured value of the flowing fluid at the first pressure;

determining a first pressure measured value of the flowing fluid at the first pressure;

driving a volume flow of the flowing fluid by means of a pump through a densimeter at a second pressure, which is maintained by means of a throttle;

determining a second density measured value of the fluid at the second pressure, which differs from the first pressure;

determining a second pressure measured value of the flowing fluid at the second pressure;

determining compressibility of the fluid based on the first density measured value, the second density measured value, the first pressure measured value and the second pressure measured value under the assumption that the composition of the fluid is unchanged between the registering of the first density measured value and the registering of the second density measured value.

In a further development of the invention, the method further includes calculating a third density value at a third pressure based on the ascertained compressibility and based on at least one of the first and second density measured values, wherein the third pressure differs from the first pressure and the second pressure, wherein the third pressure lies especially outside an interval bounded by the first pressure and the second pressure.

In a further development of the invention, the method further includes calculating a sound velocity value based on the compressibility and at least one of the density measured values.

In a further development of the invention, the determining of the compressibility occurs under the assumption of a constant temperature of the fluid at the first pressure measurement value and at the second pressure measurement value.

In a further development of the invention, a first temperature of the fluid in the measuring tube at the registering of the first density measured value differs from a second temperature of the fluid in the measuring tube at the registering of the second density measured value by no more than 5° C., especially no more than 2° C. and preferably no more than 1° C.

In a further development of the invention, the determining of the first density measured value and the determining of the second density measured value includes, in each case, registering an eigenfrequency value of at least one bending oscillation mode of the measuring tube.

In a further development of the invention, the eigenfrequency of the at least one bending oscillation mode depends on a bending stiffness of the measuring tube, which has a cross-sensitivity to the pressure of the fluid in the measuring tube, wherein the pressure-dependent bending stiffness of the measuring tube enters into the determining of the density measured value based on the registered eigenfrequencies, wherein at least one of the registered pressure measurement values is used for determining the pressure-dependent bending stiffness.

The measuring arrangement of the invention for determining compressibility of a flowing fluid and or a variable dependent on the compressibility comprises: a fluid path for conveying a medium; a pump, which is arranged in the fluid path, for driving a volume flow of the medium in the fluid path; a densimeter having at least one oscillator, which has at least one oscillatable measuring tube for conveying the medium, having at least one exciter mechanism for exciting oscillations of the measuring tube, and having at least one sensor arrangement for registering at least one oscillatory characteristic of the oscillator, wherein the measuring tube or the measuring tubes of the at least one oscillator is are arranged in the fluid path; a throttle arrangement with a changeable flow resistance, wherein the densimeter is arranged in the fluid path between the pump and the throttle arrangement, wherein the throttle arrangement serves in the case of constant volume flow rate, due to different flow resistances, to bring about different static pressure values in the densimeter; at least one pressure sensor for registering a pressure measured value of the fluid path, wherein the pressure sensor is arranged in the fluid path between the pump and the throttle arrangement; an operating and evaluation unit, which is adapted, based on at least two density measured values and the associated pressure measurement values, which were registered at different flow resistances of the throttle arrangement, to ascertain a value for the compressibility of the fluid.

In a further development of the invention, the throttle arrangement has two check valves connected in parallel, of which a first check valve has a lower working point than a second check valve, and a check valve-gate valve, which especially is automatically controllable, is placed in front of the first check valve.

In an alternative further development of the invention, the throttle arrangement includes a diaphragm with an adjustable diaphragm opening.

In a further development of the invention, the measuring arrangement further includes a second pressure sensor, wherein the densimeter is arranged between the first pressure sensor and the second pressure sensor.

In a further development of the invention, the operating and evaluation unit is adapted to determine a fluid pressure measurement value, which is associated with a density measured value and which is an average value of essentially simultaneously taken pressure measured values of the first pressure sensor and the second pressure sensor.

In a further development of the invention, the operating and evaluation unit is adapted to determine a viscosity measured value for the fluid based on volume flow and a difference between essentially simultaneously taken pressure measured values of the first pressure sensor and the second pressure sensor, and to determine the density measured value based on an oscillatory characteristic of the oscillator and the viscosity measured value.

In a further development of the invention, the operating and evaluation unit is adapted to determine a density value under reference conditions, for example, 1013 mbar, based on the density measured value, the associated pressure measured value and the ascertained value for the compressibility.

BRIEF DESCRIPTION OF THE DRAWINGS

The invention will now be explained in greater detail based on examples of embodiments illustrated in the drawing, the figures of which show as follows.

DETAILED DESCRIPTION

Figure 1:
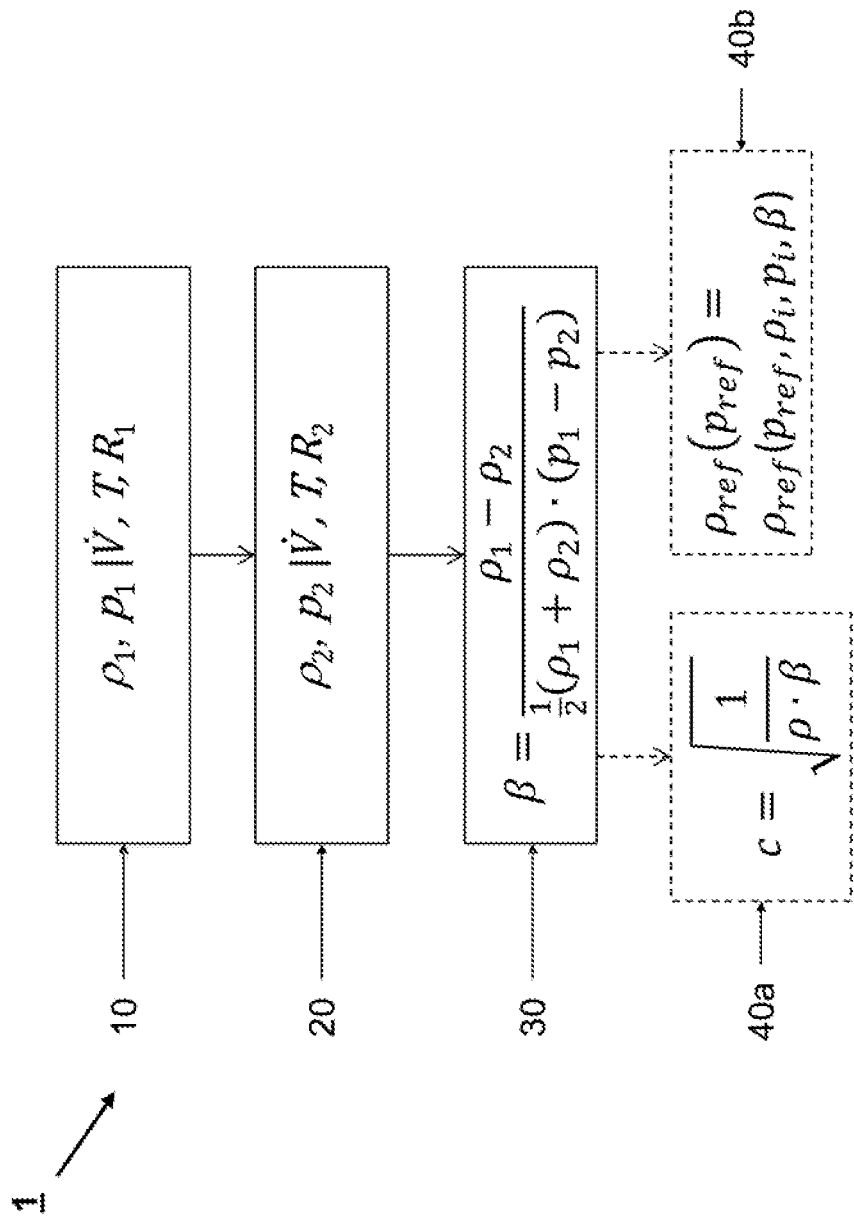
FIG. 1 shows a flow diagram of an example of an embodiment of the method of the invention.

The example shown in FIG. 1 of an embodiment of a method 1 of the invention includes in a first step 10 the registering of a first density measured value $\rho_1$ and an associated first pressure measured value $p_1$ of a flowing fluid, wherein the first pressure of the flowing fluid is produced by pumping the fluid against a first flow resistance $R_1$ of a throttle arrangement having a variable flow resistance.

After registering the first density measured value $\rho_1$ and the associated first pressure measured value $p_1$, there occurs in a second step 20 in the case of a second flow resistance $R_2$ of the throttle arrangement the registering of a second density measured value $\rho_2$ and an associated second pressure measured value $p_2$ of a flowing fluid, wherein the first flow resistance differs from the second flow resistance. In the case of an essentially constant volume flow rate of the fluid through the throttle arrangement, this leads correspondingly to different values for the first static pressure and the second static pressure of the flowing medium. Thus, for example, the first pressure may be about 0.5 to 1 bar, while the second pressure amounts to 5 to 10 bar.

The density measurement can occur, for example, by measuring a density dependent, resonant frequency of an oscillating measuring tube, through which the fluid is flowing.

In a third step 30, then, based on the two density measured values $\rho_1$, $\rho_2$ and the associated pressure measurement values $p_1$, $p_2$, the compressibility $\beta$ of the fluid is calculated according to:

$$\beta = \frac{\rho_1 - \rho_2}{\frac{1}{2}(\rho_1 + \rho_2) \cdot (p_1 - p_2)} \qquad (1)$$

Following on the ascertaining of the compressibility of the fluid, in a step 40a, the velocity of sound c of the fluid can be calculated based on a density value $\rho$ and a compressibility value $\beta$ ascertained therefore according to:

$$c = \sqrt{\frac{1}{\rho \cdot \beta}} \qquad (2)$$

The density value can, in such case, be, for example, the arithmetic average of the two density measured values $\rho_1$, $\rho_2$, based on which the compressibility $\beta$ was calculated.

Alternatively or additionally, following on the ascertaining of the compressibility of the fluid, in a step 40b, a reference density $\rho_{ref}$ can be calculated at a reference pressure $p_{ref}$, for example, 1013 mbar. In such case, the reference density depends on the reference pressure $p_{ref}$, at least one value pair of a pressure measured value $p_i$ with its associated density measured value $\rho_i$, as well as the value for the compressibility $\beta$ of the fluid ascertained therefore.

Figure 2:
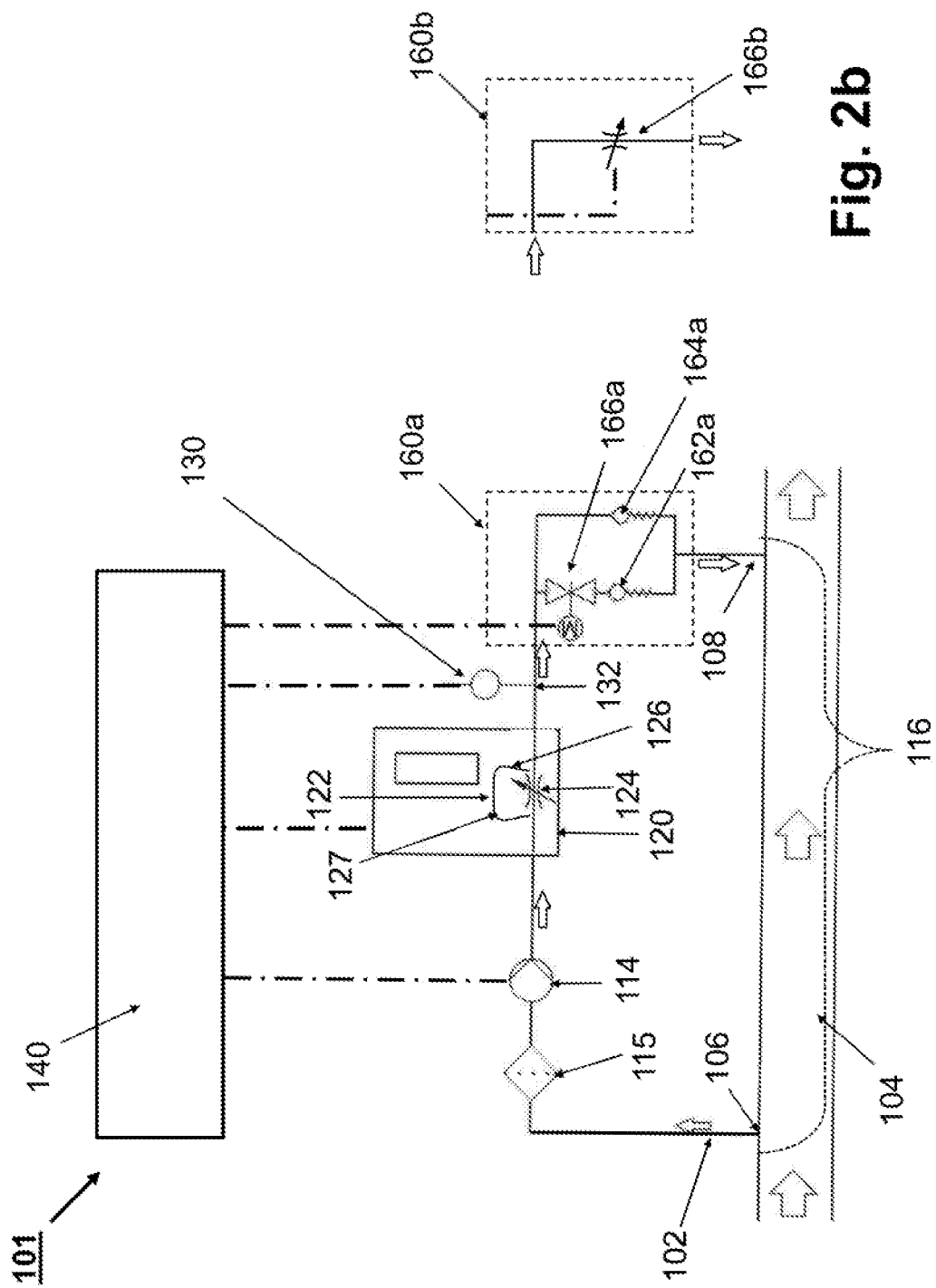
FIG. 2a shows a schematic representation of a first example of an embodiment of a measuring arrangement of the invention.
FIG. 2b shows a schematic representation of a detail variant of the first example of an embodiment of a measuring arrangement of the invention.

The example of an embodiment of a measuring arrangement 101 shown in FIG. 2a includes a withdrawal line 102, which is led parallel to a pipeline 104 between a first connection point 106 and a second connection point 108. The measuring arrangement 101 further includes in the withdrawal line 102 a micro annular gear pump 114, such as obtainable from the firm, HNP, or some other dosing or metering pump with a supply accuracy of better than 1%, especially better than 0.5%, for driving a defined volume flow through the fluid path 116 formed by the withdrawal line 102 and components arranged therein. The withdrawal line 102 has, for example, an inner diameter of 4 mm. Arranged in the withdrawal line 102 before the annular gear pump 114 is a filter element 115, which has, for example, a maximum pore size of no more than 20 μm, especially no more than 10 μm and preferably no more than 5 μm, in order to assure that subsequent components do not become plugged.

Arranged in the withdrawal line 102 is a densimeter 120 with an oscillatable measuring tube 122, which is excitable by means of an exciter to execute bending oscillations, whose resonant frequency depends on the density of a medium contained in the measuring tube 122. The measuring tube has a diameter of, for example, 160 μm and is prepared in silicon by means of MEMS technology. The resonant frequency lies in the case of a low viscosity fluid with a density of, for instance, $10^6$ g/m$^3$, for example, in the order of magnitude of 20 kHz.

The total length of a fluid path section through the measuring tube 122 and surrounding MEMS-components with an inner diameter of 200 μm amounts, for instance, to 1 cm. This fluid path section has a comparatively large flow resistance, so that it is not practical to lead the total volume flow rate through the withdrawal line 102 via this fluid path section. The expected volume flows in the case of pressure drops of several bar via the fluid path section through the measuring tube 122 would be small such that the medium in the withdrawal line 102, especially in the case of changing properties of the medium in the pipeline 104, would not be reliably representative. Therefore, the fluid path section through the MEMS components is a bypass 126 in parallel with a diaphragm 124, wherein the bypass 126 has a bypass path length of less than 20 mm, especially less than 15 mm, for example, 10 mm. The diaphragm 124 has a diameter of 0.5 to 2 mm, which is so dimensioned that, due to the volume flow rate in the withdrawal line 102, a pressure gradient is produced, which drives a part of the volume flow, for example, 0.1% to 5%, through the bypass 126. The MEMS components comprise further a temperature sensor 127, for example, a semiconductor resistance element, or a Pt resistance element, which registers especially a temperature of the measuring tube 122 or vicinity of the measuring tube, which is representative for the temperature of the medium.

The measuring arrangement 101 further includes a pressure sensor 130 for registering a pressure measured value at a pressure measuring point 132, which is arranged on the fluid path 116 between the annular gear pump 114 and a throttle arrangement 160a. More exactly stated, the pressure measuring point here is arranged, in the flow direction, after the densimeter.

Since, however, across the diaphragm 124, and the measuring tube 122, a pressure drop occurs, which is essentially proportional to the volume flow rate, the pressure at the pressure measuring point 132 is clearly lower than the average pressure in the measuring tube 122. Thus, it is advantageous to provide an additional pressure sensor between the pump and the measuring tube, and to calculate an average pressure for the fluid in the measuring tube from the measured values of the two pressure sensors below and above the measuring tube. This is especially advantageous when the actual pressure of the fluid in the measuring tube is of interest, for example, in order, starting therefrom, to calculate a density at a reference pressure. For determining the compressibility, however, a second pressure sensor is not expressly required, since, in the case of constant volume flow rate, the pressure drop across the measuring tube is constant, so that a second pressure sensor does not help in determining the pressure difference in equation (1).

The throttle arrangement 160a includes two check valves connected in parallel, of which a first check valve 162a has a lower working point than a second check valve 164a. The first working point of the first check valve 162a lies, for example, at 0.5-1 bar, while the second working point of the second check valve 164a lies at 5-10 bar. Placed in front of the first check valve 162a is an automatically controllable check valve-gate valve 166a. When the check valve-gate valve 166a is opened, the volume flow rate driven by the annular gear pump 114 can flow through the first check valve 162a, so that the static pressure of the flowing fluid is determined by the working point of the first check valve 162a. When, in contrast, the check valve-gate valve 166a is closed, volume flow rate flows through the second check valve 164a, so that the static pressure is determined by the second working point and has therewith a significantly higher value. By means of the gate valve 166a, thus, in the case of constant volume flow rate, the static pressure can be determined alternately by the first working point and the second working point. Which value the static pressure of the fluid has, can be ascertained with the pressure sensor 130 with the above explained limitations.

The measuring arrangement 101 further includes an operating and evaluation unit 140, which is adapted, based on the value tuple for different static pressure measurement values, with the associated density and, in given cases, measured values of temperature of the flowing fluid, to determine the compressibility of the fluid and therewith to ascertain a density value of the fluid at reference conditions, for example, 1013 mbar. Likewise, the operating and evaluation unit controls the check valve-gate valve 166a for controlling access to the first check valve 162a.

The electrical circuits of the pressure difference measuring arrangement, the densimeter 120, as well as the operating and evaluation unit are preferably embodied to conform to ignition protection type Ex-i (intrinsically safe). The electronic circuit of annular gear pump 114 is preferably likewise implemented to meet an ignition protection type, for example, pressure resistant encapsulation according to class, Ex-d.

FIG. 2b shows a throttle arrangement 160b, which can be applied as an alternative to the throttle arrangement 160a illustrated in FIG. 2a in the example of an embodiment according to FIG. 2a. Throttle arrangement 160b includes a diaphragm 166b with changeable flow cross section, wherein the flow cross section is adjustable via an actuator, which is controlled by the operating and evaluation unit 140. Through variation of the flow cross section, the pressure drop across the diaphragm can in the case of steady volume flow be varied, for example, between 0.1 and 10 bar.

Figure 3:
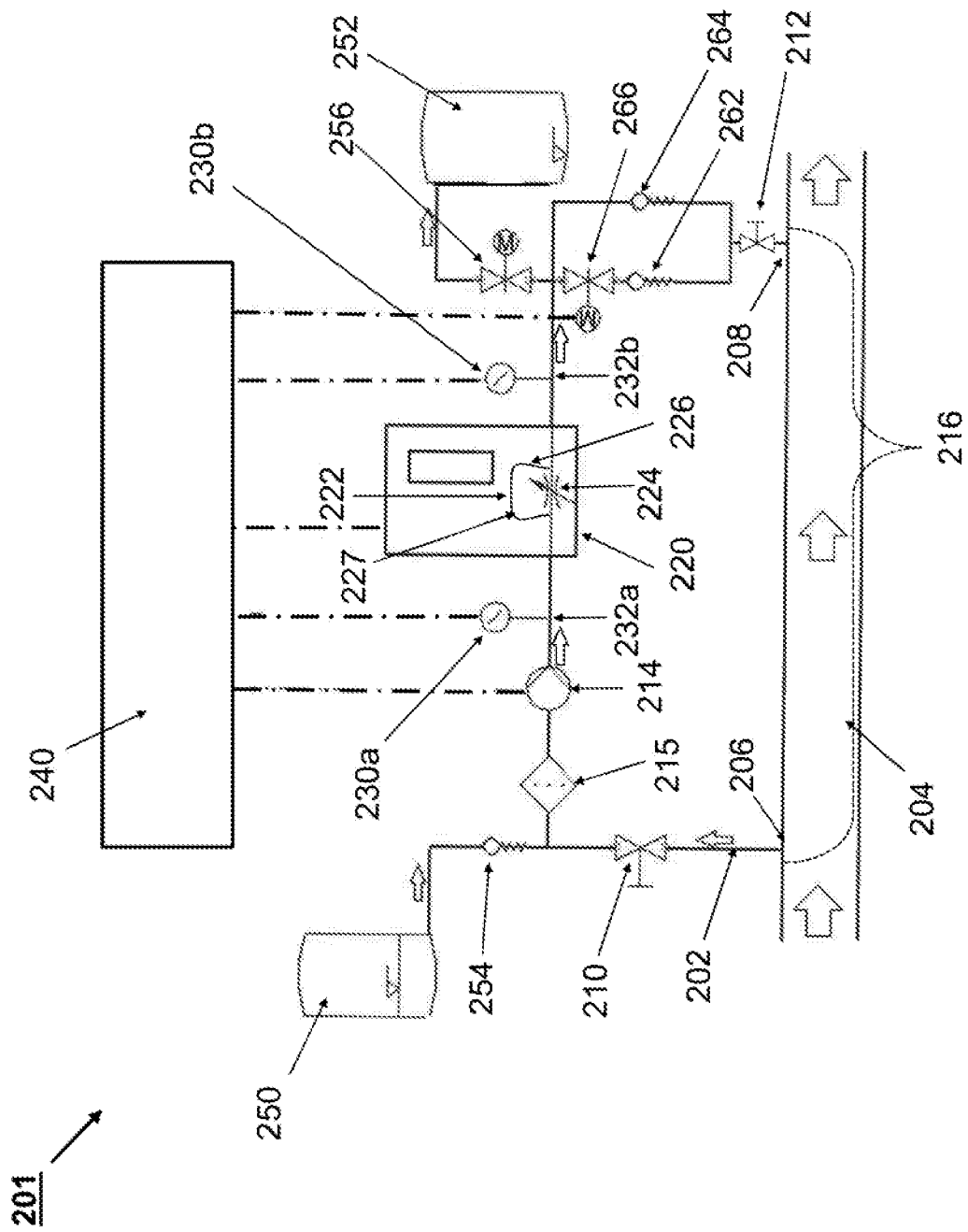
FIG. 3 shows a schematic representation of a second example of an embodiment of a measuring arrangement of the invention.

The example shown in FIG. 3 of an embodiment of a measuring arrangement 201 of the invention includes all components of the first example of an embodiment. Detailed explanations for the components of the first example of an embodiment hold correspondingly for the second example of an embodiment. The second example of an embodiment contains, moreover, other components, which enable a determining of the viscosity of the fluid and therewith a correction of viscosity dependent errors in the case of the density measurement. Together with determining compressibility according to the invention, also a still more accurate value for density under reference conditions can be given for media with higher viscosity.

The measuring arrangement 201 includes a withdrawal line 202, which is led in parallel with a pipeline 204 between a first connection point 206 and a second connection point 208. The measuring arrangement 201 further includes in the withdrawal line 202 a micro annular gear pump 214 for driving a defined volume flow through the fluid path 216 formed by the withdrawal line 202 and components arranged therein. Arranged in the withdrawal line 202 before the annular gear pump 214 is a filter element 215, in order to assure that subsequent components do not become plugged.

Arranged in the withdrawal line 202 is a densimeter 220 with an oscillatable measuring tube 222, which is excitable by means of an exciter to execute bending oscillations, whose resonant frequency depends on the density of a medium contained in the measuring tube 222. The fluid path section through the measuring tube 222 and the adjoining MEMS components is led as a bypass 226 in parallel with a diaphragm 224. Diaphragm 224 has a diameter of 0.5 to 2 mm, which is so dimensioned that, due to the volume flow rate in the withdrawal line 202, a pressure gradient is produced, which drives a part of the volume flow, for example, 0.1% to 5%, through the bypass 226. The MEMS components further comprise a temperature sensor 227, for example, a semiconductor resistance element, or a Pt resistance element, which registers especially a temperature of the measuring tube 222, or the vicinity of the measuring tube, representative for the temperature of the medium.

Measuring arrangement 201 further includes a first pressure sensor 230a for registering a pressure measured value at a first pressure measuring point 232a, which is arranged on the fluid path 216 between the annular gear pump 240 and the densimeter 220, and a second pressure sensor 230b for registering a pressure measured value at a second pressure measuring point 232b, which is arranged on the fluid path 116 between the densimeter 220 and a throttle arrangement 160a.

The purpose of the two pressure sensors 230a and 230b has two aspects. First, the weaknesses of the pressure measurement with only one pressure sensor discussed in connection with the first example of an embodiment are overcome, in that an averaging of the pressure measured values of the first and the second pressure sensor occurs.

Furthermore, by forming a difference between the pressure measured values of the first pressure sensor 230a and the second pressure sensor 230b, the pressure drop across the densimeter 220 can be calculated, from which, in the case of given volume flow, the viscosity of the fluid can be ascertained.

The throttle arrangement 260 includes two check valves connected in parallel, of which a first check valve 262 has a lower working point than a second check valve 264. The first working point of the first check valve 262 lies, for example, at 0.5-1 bar, while the second working point of the second check valve 264 lies at 5-10 bar. Placed in front of the first check valve 262 is an automatically controllable, check valve-gate valve 266. When the check valve-gate valve 266 is opened, the volume flow rate driven by the annular gear pump 214 can flow via the first check valve 262, so that the static pressure of the flowing fluid is determined by the working point of the first check valve 262. When, in contrast, the gate valve 266 is closed, volume flow rate flows via the second check valve 264, so that the static pressure is determined via the second working point and therewith has a significantly higher value. By means of the gate valve 266, thus, in the case of constant volume flow rate, the static pressure can alternately be determined by the first working point and the second working point. Which value the static pressure of the fluid in the measuring tube 222 has can be ascertained by averaging the pressure measurement values of the first pressure sensor 230a and the second pressure sensor 230b.

Measuring arrangement 201 further includes an operating and evaluation unit 240, which is adapted, based on the values for volume flow, and the associated pressure difference, to determine a current viscosity measured value of the fluid, and, based on a measured resonant frequency of the measuring tube, or a density measured value derived therefrom, to calculate a density measured value corrected relative to a viscosity influence. Furthermore, the operating and evaluation unit is 240 suitable, based on value tuples for different averaged static pressure measurement values in the measuring tube, with the associated density measured values corrected relative to influence of the viscosity, and, in given cases, measured values of temperature of the flowing fluid, to determine the compressibility of the fluid. Based on these values, a density of the fluid is calculated at a reference pressure, for example, 1013 mbar.

As before, the operating and evaluation unit controls the check valve-gate valve 266 for controlling access to the first check valve 262a.

Measuring arrangement 201 can further have a supply container 250 and a waste container 252 for an auxiliary medium. The auxiliary medium can be, on the one hand, a cleaning liquid, for example, gasoline, or a reference medium with defined viscosity or density for calibrating the measuring arrangement 201. In order that the auxiliary medium cannot get uncontrollably into the pipeline 204, provided in the withdrawal line 202 near the first and second connection points 206, 208 are first and second gate valves 210, 212. The supply container 250 is connected to the withdrawal line between the first gate valve 210 and the filter 215 by means of a branch line, wherein a check valve 254 is arranged in the branch line. The waste container 252 is connected to the withdrawal line between the second pressure sensor 230b and the throttle arrangement 260 by means of a branch line, wherein a gate valve 256 is arranged in the branch line.

The invention claimed is:

1. A method for determining compressibility of a flowing fluid, the method comprising:
   driving a first volume flow of a fluid through a measuring tube of a vibronic densimeter at a first pressure using a pump, wherein the first pressure is maintained using a throttle;
   determining a first density measured value of the flowing fluid at the first pressure;
   determining a first pressure measured value of the flowing fluid at the first pressure;
   driving a second volume flow of the fluid through the densimeter at a second pressure using the pump, wherein the second pressure is maintained using the throttle and differs from the first pressure;
   determining a second density measured value of the flowing fluid at the second pressure;
   determining a second pressure measured value of the flowing fluid at the second pressure;
   determining a compressibility of the fluid based on the first density measured value, the second density measured value, the first pressure measured value and the second pressure measured value using an assumption that the composition of the fluid is unchanged between the determining of the first density measured value and the determining of the second density measured value.

2. The method of claim 1, further comprising:
   calculating a third density value at a third pressure based on the determined compressibility and based on at least one of the first density measured value or the second density measured value, wherein the third pressure differs from the first pressure and the second pressure, and wherein the third pressure lies outside an interval bounded by the first pressure and the second pressure.

3. The method of claim 1, further comprising:
   calculating a sound velocity value based on the determined compressibility and at least one of the first density measured value, the second density measured value or the third density value.

4. The method of claim 1, wherein the determining of the compressibility occurs using an assumption of a constant temperature of the fluid at the first pressure measurement value and at the second pressure measurement value.

5. The method of claim 1, wherein a first temperature of the fluid in the measuring tube when determining the first density measured value differs from a second temperature of the fluid in the measuring tube when determining the second density measured value by no more than 5° C.

6. The method of claim 1, wherein a first temperature of the fluid in the measuring tube when determining the first density measured value differs from a second temperature of the fluid in the measuring tube when determining the second density measured value by no more than 2° C.

7. The method of claim 1, wherein a first temperature of the fluid in the measuring tube when determining the first density measured value differs from a second temperature of the fluid in the measuring tube when determining the second density measured value by no more than 1° C.

8. The method of claim 1, wherein the determining of the first density measured value and the determining of the second density measured value includes, in each case, determining an eigenfrequency value of at least one bending oscillation mode of the measuring tube.

9. The method of claim 8, wherein the eigenfrequency value of the at least one bending oscillation mode depends on a pressure-dependent bending stiffness of the measuring tube, having a cross-sensitivity to the pressure of the fluid in the measuring tube, wherein the pressure-dependent bending stiffness of the measuring tube is used to determine the first density measured value based on the determined eigenfrequency value, wherein at least one of the first pressure measurement value and the second pressure measurement value is used to determine the pressure-dependent bending stiffness.

10. The method of claim 1, further comprising:
determining a viscosity of the fluid based on a pressure drop along a section of a fluid path, wherein the fluid path includes the densimeter, and wherein at least one of the first density measured value, the second density measured value or the third density value is corrected relative to a cross-sensitivity to the viscosity of the fluid.

11. A measuring arrangement for determining compressibility of a flowing fluid and or a variable dependent on the compressibility, comprising:
a fluid path embodied to conveying a medium;
a pump arranged in the fluid path and configured to drive a volume flow of the medium in the fluid path;
a densimeter including an oscillator, the oscillator including an oscillatable measuring tube structured to convey the medium, an exciter mechanism configured to excite oscillations in the measuring tube, and a sensor arrangement for registering at least one oscillatory characteristic of the oscillator, wherein the measuring tube of the oscillator is arranged in the fluid path;
a throttle arrangement with a changeable flow resistance, wherein the densimeter is arranged in the fluid path between the pump and the throttle arrangement, and wherein the throttle arrangement generates different static pressure values in the densimeter by applying different flow resistances when the medium flows at a constant volume flow rate;
a first pressure sensor for registering a pressure measured value of the fluid path, wherein the first pressure sensor is arranged in the fluid path between the pump and the throttle arrangement; and
an operating and evaluation unit configured to ascertain a value for a compressibility of the fluid based on at least two density measured values and respective associated pressure measurement values, which were registered at the different flow resistances of the throttle arrangement.

12. The measuring arrangement of claim 11, wherein the throttle arrangement includes a first check valve and a second check valve connected in parallel, wherein the first check valve has a lower working point than a second check valve, and includes a check valve-gate valve disposed upstream of the first check valve.

13. The measuring arrangement of claim 12, wherein the check valve-gate valve is automatically controllable.

14. The measuring arrangement of claim 11, wherein the throttle arrangement includes a diaphragm with an adjustable diaphragm opening.

15. The measuring arrangement of claim 11, further comprising:
a second pressure sensor, wherein the densimeter is arranged between the first pressure sensor and the second pressure sensor.

16. The measuring arrangement of claim 15, wherein the operating and evaluation unit is configured to determine a fluid pressure measurement value associated with at least one of the at least two density measured values, and wherein the fluid pressure measurement value is an average value of essentially simultaneously taken pressure measured values of the first pressure sensor and the second pressure sensor.

17. The measuring arrangement of claim 15, wherein the operating and evaluation unit is configured to determine a viscosity measured value for the fluid based on volume flow and a difference between essentially simultaneously taken pressure measured values of the first pressure sensor and the second pressure sensor, and to determine at least one of the at least two density measured values based on the oscillatory characteristic of the oscillator and the viscosity measured value.

18. The measuring arrangement of claim 11, wherein the operating and evaluation unit is adapted to determine a density value under reference conditions based on at least one of the at least two density measured values, the associated pressure measured value, and the ascertained value for the compressibility.

* * * * *